United States Patent
Kim et al.

(10) Patent No.: US 11,126,463 B2
(45) Date of Patent: Sep. 21, 2021

(54) SYSTEM FOR PROVIDING FUNCTION AS A SERVICE (FAAS), AND OPERATING METHOD OF SYSTEM

(71) Applicant: SAMSUNG ELECTRONICS CO., LTD., Suwon-si (KR)

(72) Inventors: Keun-seob Kim, Suwon-si (KR); Jin-woo Song, Seoul (KR); Hong-uk Woo, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/058,597

(22) Filed: Aug. 8, 2018

(65) Prior Publication Data

US 2019/0050258 A1    Feb. 14, 2019

Related U.S. Application Data

(60) Provisional application No. 62/542,916, filed on Aug. 9, 2017.

(30) Foreign Application Priority Data

Jul. 19, 2018 (KR) .................. 10-2018-0084271

(51) Int. Cl.
  *G06F 9/455* (2018.01)
  *G06F 9/50* (2006.01)

(52) U.S. Cl.
  CPC .......... *G06F 9/5005* (2013.01); *G06F 9/5011* (2013.01); *G06F 9/5016* (2013.01);
  (Continued)

(58) Field of Classification Search
  CPC .... G06F 9/5005; G06F 9/5026; G06F 9/5033; G06F 9/5038; G06F 9/5044; G06F 9/505;
  (Continued)

(56) References Cited

U.S. PATENT DOCUMENTS

| | | | |
|---|---|---|---|
| 6,141,723 A | * | 10/2000 | Lyons ................. G06F 9/44521 711/102 |
| 8,495,197 B1 | | 7/2013 | Nagargadde et al. |

(Continued)

FOREIGN PATENT DOCUMENTS

| | | | |
|---|---|---|---|
| CN | 106375115 A | * | 2/2017 |
| JP | 2015-524581 A | | 8/2015 |

(Continued)

OTHER PUBLICATIONS

Shi et a., Resource Distribution Method of Device, Feb. 1, 2017, patents.google.com (Year: 2017).*

(Continued)

*Primary Examiner* — Emerson C Puente
*Assistant Examiner* — Zhi Chen
(74) *Attorney, Agent, or Firm* — Sughrue Mion, PLLC

(57) ABSTRACT

A system for providing a function as a service (FaaS) is provided. The system includes a communicator which receives a request for setting resources to execute the function, a memory which stores one or more instructions, and a processor. The processor executes the stored instructions. When the processor executes the instructions, it analyzes characteristics of the function and provides recommendation information related to the setting of the resources to execute the function based on a result of the analyzing.

16 Claims, 8 Drawing Sheets

(52) U.S. Cl.
CPC ...... *G06F 9/5027* (2013.01); *G06F 2209/508* (2013.01); *G06F 2209/5011* (2013.01)

(58) Field of Classification Search
CPC .... G06F 9/5055; G06F 9/5011; G06F 9/5016; G06F 9/5027; G06F 2209/5011; G06F 2209/508; H04L 67/10; H04L 67/1008; H04L 67/101; H04L 67/1012; H04L 67/1014; H04L 67/1017; H04L 67/1021; H04L 67/1023; H04L 67/1004; H04L 67/1025; H04L 67/1029; H04L 67/1031
See application file for complete search history.

(56) References Cited

U.S. PATENT DOCUMENTS

| | | | |
|---|---|---|---|
| 9,047,133 | B2 | 6/2015 | Winterfeldt et al. |
| 9,240,949 | B2* | 1/2016 | McMurry ............. H04L 47/127 |
| 10,037,500 | B2* | 7/2018 | Placiakis ........ G06Q 10/063116 |
| 10,069,680 | B1* | 9/2018 | Wylie ................ H04L 41/0806 |
| 2003/0158884 | A1* | 8/2003 | Alford, Jr. ............. G06F 9/5061 718/104 |
| 2005/0288961 | A1 | 12/2005 | Tabrizi |
| 2009/0017916 | A1* | 1/2009 | Blanchard, III ........ A63F 13/79 463/42 |
| 2009/0125910 | A1* | 5/2009 | Lazarus ................ G06F 9/5011 718/104 |
| 2010/0262660 | A1 | 10/2010 | Little et al. |
| 2011/0061057 | A1* | 3/2011 | Harris ................... G06F 9/5072 718/104 |
| 2011/0149321 | A1* | 6/2011 | Cho .................. H04N 1/00915 358/1.13 |
| 2014/0068221 | A1* | 3/2014 | Feng .................... G06F 12/023 711/170 |
| 2014/0122595 | A1 | 5/2014 | Murdoch et al. |
| 2014/0136295 | A1* | 5/2014 | Wasser ............ G06Q 10/06312 705/7.38 |
| 2014/0156835 | A1 | 6/2014 | Atchison et al. |
| 2014/0330949 | A1 | 11/2014 | Thompson et al. |
| 2015/0236977 | A1 | 8/2015 | Terayama et al. |
| 2015/0348165 | A1* | 12/2015 | Kuroki ............... G06Q 30/0631 705/26.7 |
| 2016/0154676 | A1* | 6/2016 | Wen ..................... G06F 9/45533 718/1 |
| 2016/0374637 | A1* | 12/2016 | Lee ........................ A61B 6/589 378/54 |
| 2017/0026421 | A1 | 1/2017 | Oh et al. |
| 2017/0126792 | A1 | 5/2017 | Halpern et al. |
| 2017/0337561 | A1* | 11/2017 | Curtis ................. G06F 16/2457 |
| 2018/0210763 | A1* | 7/2018 | Kumar .................... G06F 9/505 |
| 2018/0260301 | A1* | 9/2018 | Podjarny ............... G06F 11/366 |
| 2018/0295033 | A1* | 10/2018 | Vladimirskiy .......... G06F 9/505 |
| 2019/0028552 | A1* | 1/2019 | Johnson, II ........... H04L 45/306 |

FOREIGN PATENT DOCUMENTS

| | | |
|---|---|---|
| KR | 10-1360263 B1 | 2/2014 |
| KR | 10-1374120 B1 | 3/2014 |
| KR | 10-2017-0011802 A | 2/2017 |
| KR | 10-2017-0078012 A | 7/2017 |
| WO | 2016/105362 A1 | 6/2016 |

OTHER PUBLICATIONS

Search Report and Written Opinion dated Nov. 7, 2018, issued by the International Searching Authority in International Application No. PCT/KR2018/008887 (PCT/ISA/210 and PCT/ISA/237).

Communication dated Jul. 3, 2019, issued by the Korean Intellectual Property Office in counterpart Korean Application No. 10-2018-0084271.

Communication dated Mar. 3, 2020 issued by the Korean Intellectual Property Office in counterpart Korean Application No. 10-2018-0064271.

Communication dated Jan. 2, 2020 issued by the European Intellectual Property Office in counterpart European Application No. 18845032.4.

* cited by examiner

SYSTEM FOR PROVIDING FUNCTION AS A SERVICE (FAAS), AND OPERATING METHOD OF SYSTEM

CROSS-REFERENCE TO RELATED APPLICATION(S)

This application is based on and claims priority under 35 U.S.C. § 119 to U.S. Provisional Application No. 62/542,916, filed on Aug. 9, 2017, in the U.S. Patent and Trademark Office, and to Korean Patent Application No. 10-2018-0084271, filed on Jul. 19, 2018, in the Korean Intellectual Property Office, the disclosures of which are incorporated by reference herein in their entireties.

BACKGROUND

1. Field

The disclosure relates to systems for providing a function as a service (FaaS) and methods of operating the systems, and more particularly, to systems capable of efficiently using resources when executing a FaaS and methods of operating the systems.

2. Description of Related Art

On a function as a service (FaaS) platform, the entire infrastructure such as programs needed for application development, networks, or storage or the like are provided, and thus, a developer does not have to additionally set up a computer server (a virtual server, a web server or the like) or add or manage resources such as an operating system (OS) or a memory. In addition, because source codes are provided in units of functions, a developer may search for a needed function and use the same. That is, a developer just has to access a FaaS and write program codes by using a serviced function. In this regard, a FaaS is also referred to as serverless computing. In a FaaS, a size of a serviced function is limited and a common container is generated in advance for a higher response speed. However, a uniform response speed is not guaranteed for each requested function and thus delay time is generated, and resources may be unnecessarily wasted.

The above information is presented as background information only to assist with an understanding of the present disclosure. No determination has been made, and no assertion is made, as to whether any of the above might be applicable as prior art with regard to the present disclosure.

SUMMARY

In accordance with an aspect of the disclosure, systems for allocating optimized resources for a function based on at least one of characteristics of the function and execution information of the function, are provided and operating methods of the systems are also provided.

Additional aspects will be set forth in part in the description which follows and, in part, will be apparent from the description, or may be learned by practice of the presented embodiments.

In accordance with an aspect of the disclosure, a system for providing a function as a service (FaaS) includes: a communicator configured to receive a request for setting resources to execute the function; a memory storing one or more instructions; and a processor configured to execute the one or more instructions stored in the memory. The processor is further configured to execute the one or more instructions to analyze characteristics of the function and provide recommendation information related to the setting of the resources based on a result of the analyzing.

The processor may be further configured to execute the one or more instructions to determine a computation amount of the function based on at least one of test log information of the function, a code size of the function, whether an external library is needed during execution of the function, and whether other functions are included in the function, and provide the recommendation information based on the computation amount of the function.

The processor may be further configured to execute the one or more instructions to analyze execution information of the function and provide the recommendation information based on a result of the analyzing.

The execution information of the function may include at least one of a point in time of an execution request for the function, a number of times of the execution request for the function, and a frequency of the execution request for the function. The processor is further configured to execute the one or more instructions to monitor the point in time of the execution request for the function to determine time information about a time at which the execution request for the function is made a preset number of times or more, and provide the recommendation information based on the number of times of the execution request for the function corresponding to the time information.

The communicator may be further configured to receive an execution request for the function, and the processor may be further configured to execute the one or more instructions to analyze at least one of characteristics of the function and execution information of the function, allocate resources to execute the function based on a result of the analyzing, and execute the function by using the allocated resources in response to the execution request.

The processor may be further configured to execute the one or more instructions to generate, based on at least one of characteristics of a first function and execution information of the first function, a first container corresponding to the first function, and generate a second container corresponding to a second function based on at least one of characteristics of the second function and execution information of the second function. When there is an execution request for the first function, the first function is executed by using the first container, and when there is an execution request for the second function, the second function is executed by using the second container.

The processor may be further configured to execute the one or more instructions to monitor a point in time of an execution request for the function to determine time information about a time at which an execution request for the function is made a preset number of times or more, and allocate resources for executing the function based on the determined time information.

The processor may be further configured to execute the one or more instructions to generate, before a point in time corresponding to the time information, an invoker and a container to execute the function.

The processor may be further configured to execute the one or more instructions to determine an amount of resources for executing the function based on a number of times of an execution request for the function corresponding to the time information.

The allocated resources may include a container in which an external library needed to execute the function is downloaded in advance.

The processor may be further configured to execute the one or more instructions to determine a computation amount of the function based on characteristics information of the function, and to allocate N containers to the function when the computation amount of the function is less than a preset computation amount and allocate M containers, which is more than N containers, to the function when the computation amount of the function is equal to or greater than the preset computation amount.

In accordance with another aspect of the disclosure, an operating method of a system providing a function as a Service (FaaS) includes: receiving a setting request for resources for executing the function; analyzing characteristics of the function; and providing recommendation information related to a setting of the resources based on a result of the analyzing.

In accordance with another aspect of the disclosure, a computer program product includes at least one computer-readable recording medium storing a program. The program, when executed on a computing device, causes the computing device to: receive a setting request for resources for executing a function as a Service (FaaS), analyze characteristics of the function, and provide recommendation information related to a setting of the resources based on a result of the analysis.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
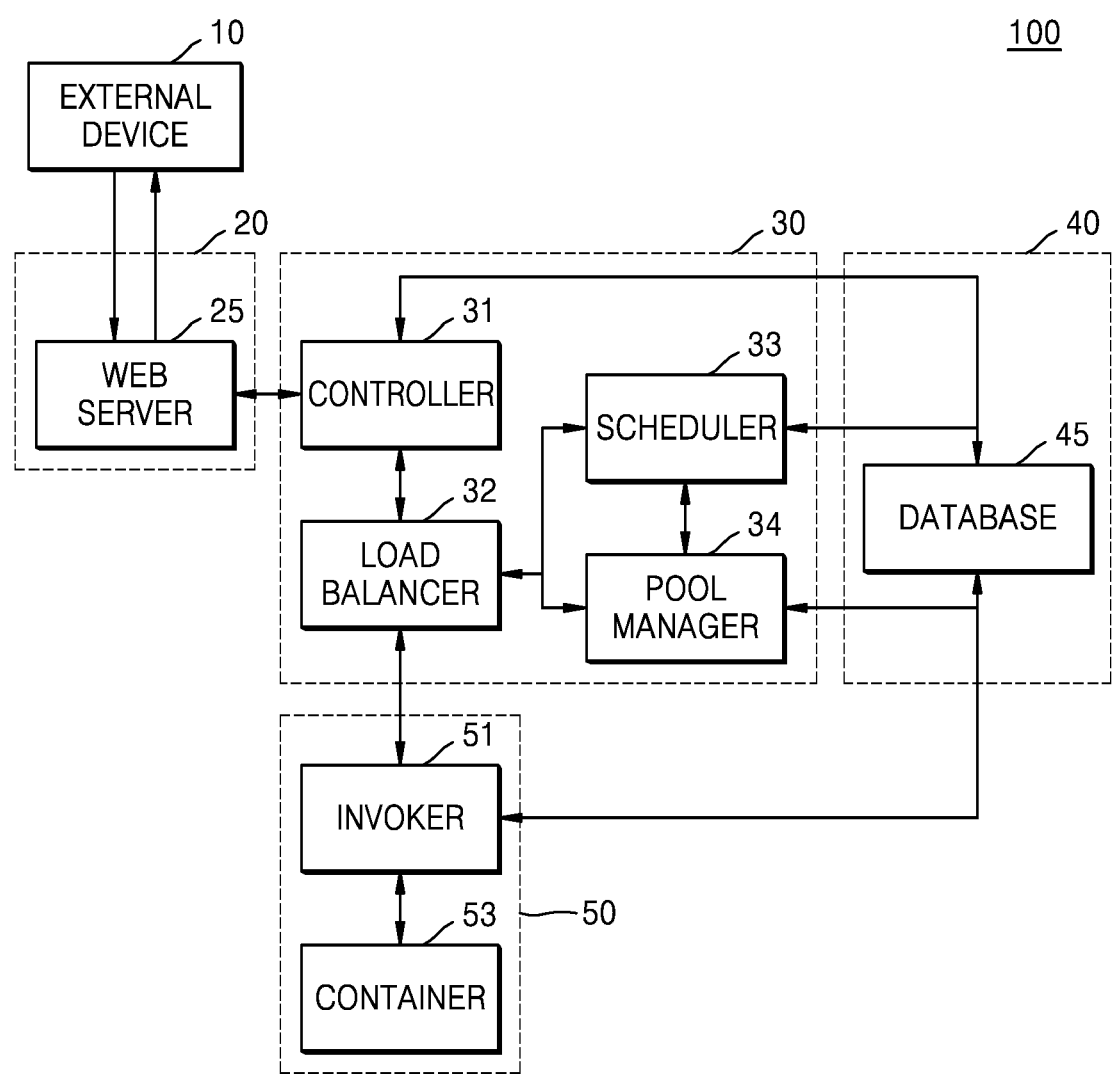
FIG. 1 is a block diagram illustrating a configuration of a system providing a function as a service (FaaS), according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects. Expressions such as "at least one of," when preceding a list of elements, modify the entire list of elements and do not modify the individual elements of the list.

Hereinafter, the terms used in the specification will be briefly described, and then the present disclosure will be described in detail.

The terms used in this specification are those general terms currently widely used in the art in consideration of functions in regard to the present disclosure, but the terms may vary according to the intention of those of ordinary skill in the art, precedents, or new technology in the art. Also, specified terms may be selected by the applicant, and in this case, the detailed meaning thereof will be described in the detailed description of the disclosure. Thus, the terms used in the specification should be understood not as simple names but based on the meaning of the terms and the overall description of the disclosure.

Throughout the specification, it will also be understood that when a component "includes" an element, unless there is another opposite description thereto, it should be understood that the component does not exclude another element but may further include another element. In addition, terms such as " . . . unit", " . . . module", or the like refer to units that perform at least one function or operation, and the units may be implemented as hardware or software or as a combination of hardware and software.

The disclosure now will be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those of ordinary skill in the art. Like numbers refer to like elements throughout.

Throughout the specification, a "user" may refer to a person who controls a system, a function or an operation, and may be, for example, a developer, a manager, or an installation engineer.

FIG. 1 is a block diagram illustrating a configuration of a system 100 providing a function as a service (FaaS), according to an embodiment.

The system 100, according to an embodiment, is a system for providing a serverless cloud computing service, and may provide a cloud computing method of executing a code to respond to an event. Here, the term "serverless" means that there is no additionally allocated server with respect to a corresponding event so that a user does not have to control infrastructure or a platform. The system 100, according to an embodiment, may provide a function as a service (FaaS) for executing a code in units of functions when an event is generated.

Referring to FIG. 1, the system 100, according to an embodiment, may include a web server 25, a controller 31, a load balancer 32, a scheduler 33, a pool manager 34, a database 45, an invoker 51, and a container 53.

The web server 25 operates as a front-end of the system 100 according to an embodiment and provides a website to a user of the external device 10. For example, when a user requests a service, the web server 25 provides a web page written in HTML through a network. The web server 25 may be an Nginx web server or an Apache web server or the like, but is not limited thereto.

The web server 25, according to an embodiment, may receive an execution request for a function (a FaaS) in various forms from the external device 10.

The web server 25 may transfer the execution request for a function received from the external device 10 to the controller 31, and receive an execution result of the function from the controller 31 and transmit the result to the external device 10.

The external device 10, according to an embodiment, may be implemented using various electronic devices such as mobile phones, tablet PCs, digital cameras, camcorders, laptop computers, desktops, electronic book terminals, digital broadcasting terminals, personal digital assistants (PDAs), portable multimedia players (PMPs) navigation devices, MP3 players, Internet of Things (IoT) devices, wearable devices, consumer electronics (CE) devices (e.g., refrigerators with display panels, air conditioners, etc.), but is not limited thereto.

The controller 31, according to an embodiment, determines whether a request received from the external device 10 contains an authority, by using the database 45, and when an authority is determined, the controller 31 may transfer the request to the load balancer 32. Here, transfer of requests or data or the like between the controller 31 and the load balancer 32 may be done through a message queue, but is not limited thereto.

The load balancer 32 may allocate a job corresponding to the request, to an invoker 51 that is most appropriate for the request from among a plurality of invokers. Here, transfer of requests or data or the like between the load balancer 32 and the invoker 51 may be done through a message queue, but is not limited thereto.

The invoker 51 may take information needed for the job allocated by the load balancer 32 from the database 45, and control the container 53 such that the job is executed by the container 53. For example, the invoker 51 may take a code corresponding to a function, for which the execution is requested, from the database 45, and transfer the code to the container 53, and the container 53 may execute the code received from the invoker 51.

The scheduler 33 and the pool manager 34 will be described in detail with reference to FIG. 2.

Meanwhile, the database 45 may store, for example, authority information for executing a function registered with the system 100, according to an embodiment, a code corresponding to a function registered with the system 100, and data, files, and libraries needed for executing a function.

Elements of the system 100, according to an embodiment, may be classified into a front-end layer 20, a scheduling layer 30, a job layer 50, and a storage layer 40, but this is exemplary, and the elements are not limited thereto.

Figure 2:
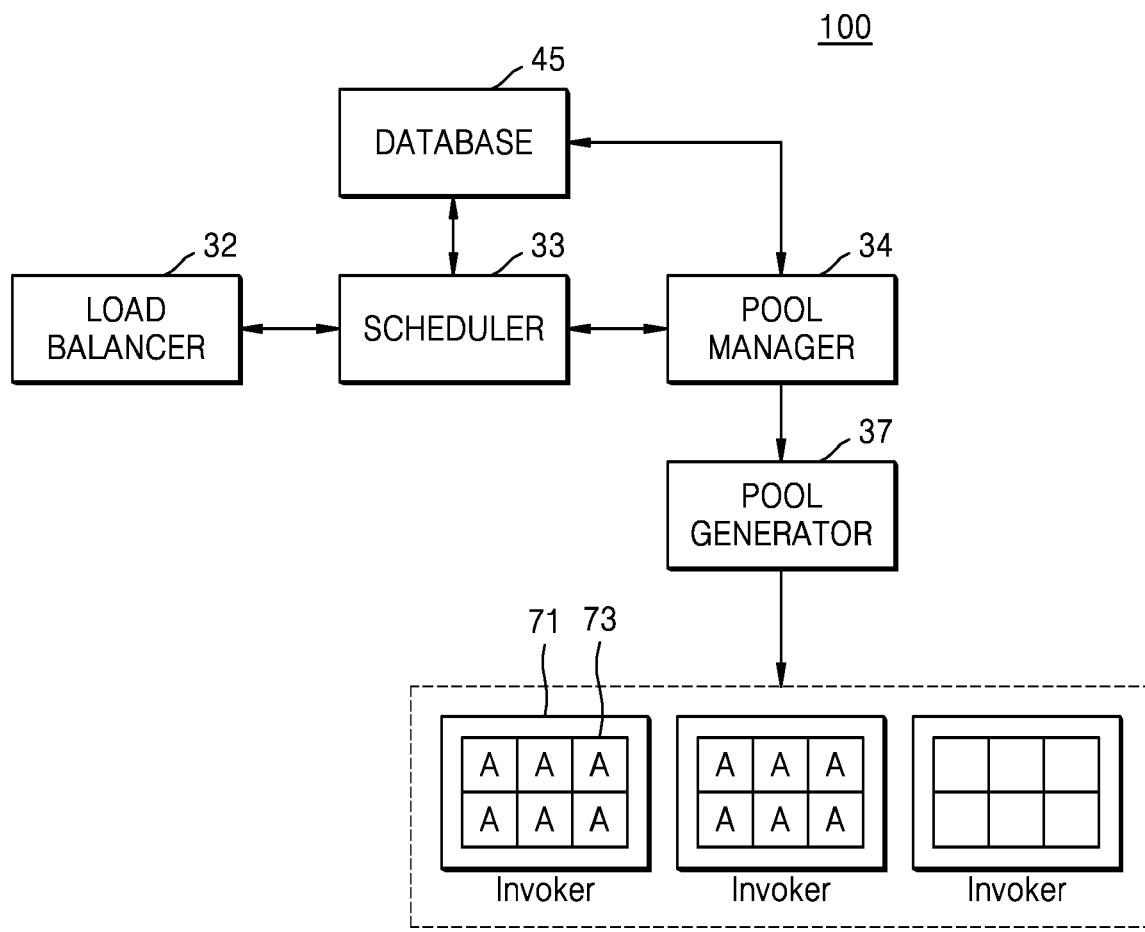
FIG. 2 is a block diagram illustrating a detailed configuration of a system, according to an embodiment.

FIG. 2 is a block diagram illustrating a configuration of a system 100, according to an embodiment.

Referring to FIG. 2, the system 100, according to an embodiment, may include a database 45, a load balancer 32, a scheduler 33, a pool manager 34, and a pool generator 37.

The scheduler 33 may monitor a request received by the load balancer 32. For example, when a message queue is included between the controller 31 and the load balancer 32 of FIG. 1, the scheduler 33 may monitor requests stored in the message queue. However, the scheduler 33 is not limited thereto. The scheduler 33 may monitor execution information of a function, and may monitor, for example, a point in time when an execution request for a function is received, the number of times that an execution request for a function is requested, a frequency of execution requests for a function. In addition, the scheduler 33 may count the number of times of function execution requests according to months, days of the week, time zones, or anniversaries. The scheduler 33 may monitor execution information of each function, analyze the monitored information, and store the information in the database 45.

For example, the scheduler 33 may determine, for each function, time information which is information about a time at which an execution request for the function is made, a preset number of times or more, and store the determined time information in the database 45. In addition, the scheduler 33 may determine an amount of resources needed to execute a function in response to a number of times of execution requests received at a time corresponding to the time information and an execution request received at a time corresponding to the time information, and store the determined amount of resources in the database 45, but is not limited thereto.

Meanwhile, the scheduler 33 may predict, for each function, a point in time of an execution request for a function or a number of times of execution requests at the point in time, based on a prediction model. The prediction model may be trained by using execution information of a function. In addition, the scheduler 33 may predict, for each function, a job load, a response time, a function execution time, a memory size needed for execution of a function or the like, based on a prediction model. The prediction model may be trained by using characteristics of a function. The prediction model may be a model based on a neural network, such as a deep neural network (DNN), a recurrent neural network (RNN), a bidirectional recurrent deep neural network (BRDNN), but is not limited thereto.

Meanwhile, the database 45 may store a result of analyzing function characteristics. For example, the system 100 may analyze test log information of a function, a code size of a function, whether an external library is needed during execution of a function, whether other functions are included in a function, or the like, and may determine an amount of resources to execute the function based on an analysis result and store the amount of resources in the database 45.

The pool manager 34 may take, from the database 45, pool configuration information corresponding to a function, and control the pool generator 37 such that the pool generator 37 generates a pool based on the pool configuration information. For example, when the number of times of an execution request for function A is equal to or greater than a preset number of times at 0:00 on January 1 of every year, the pool manager 34 may request the pool generator 37 to generate, before 0:00 on January 1 of each year, a first container and a first invoker to execute function A. Accordingly, the pool generator 37 may generate a first container 73 and a first invoker 71 to execute function A before 0:00 on January 1 of every year.

At least one of the web server 25, the controller 31, the load balancer 32, the scheduler 33, the pool manager 34, the database 45, the invoker 51, and the container 53 of FIGS. 1 and 2 may be manufactured in a hardware form and mounted in one apparatus or may be respectively mounted in different apparatuses. In addition, at least one of the web server 25, the controller 31, the load balancer 32, the scheduler 33, the pool manager 34, the database 45, the invoker 51, and the container 53 may be implemented as a software module. When at least one of the web server 25, the controller 31, the load balancer 32, the scheduler 33, the pool manager 34, the database 45, the invoker 51, and the container 53 is implemented as a software module (or a program module including an instruction), the software module may be stored in a computer-readable non-transitory computer readable medium. Further, in this case, the at least one software module may be provided by an operating system (OS) or by a predetermined application. Alternatively, portions of the at least one software module may be provided by an OS, and other portions of the software module may be provided by a predetermined application.

Figure 3:
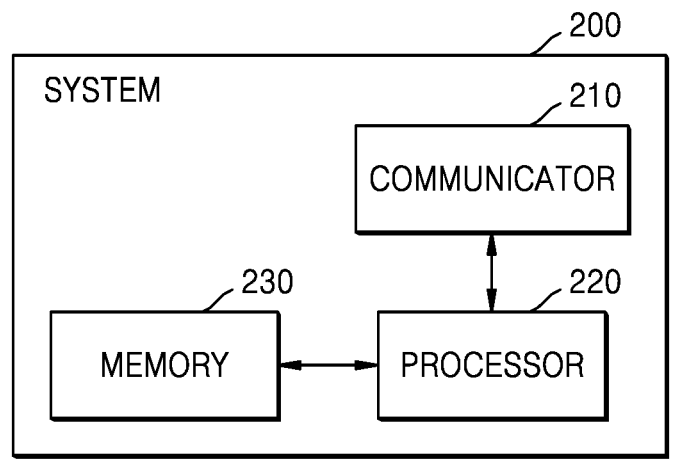
FIG. 3 is a block diagram illustrating a configuration of a system, according to an embodiment.

FIG. 3 is a block diagram illustrating a system 200, according to an embodiment.

The system 200, according to an embodiment, may include a communicator 210, a processor 220, and a memory 230.

The processor 220, according to an embodiment, may control the overall system 200. The processor 220, according to an embodiment, may execute one or more programs stored in the memory 230.

The memory 230, according to an embodiment, may store various data, programs or applications to drive and control the system 200. A program stored in the memory 230 may include one or more instructions. A program (one or more instructions) or application stored in the memory 230 may be executed by the processor 220. In addition, the processor 220 may include the database 45 illustrated in and described with reference to FIGS. 1 and 2, but is not limited thereto.

The processor 220, according to an embodiment, may perform at least one of the operations performed by the controller 31, the load balancer 32, the scheduler 33, the pool manager 34, the invoker 51, and the container 53, illustrated in and described with reference to FIGS. 1 and 2.

For example, the processor 220 may analyze at least one of execution information of a function and characteristics of the function. The processor 220 may monitor a point in time of an execution request for a function, the number of times of an execution request for the function, and a frequency of execution requests for the function, to analyze execution information of the function. In addition, by using a result of analyzing the execution information of the function, the processor 220 may provide recommendation information related to a resource setting for a particular time or day of the week (recommendation information related to memory specifications or central processing unit (CPU) specifications).

Alternatively, the processor 220 may analyze test log information of a function, a code size of the function, whether an external library is needed during an execution of the function, whether other functions are included in the function, or the like. In addition, based on at least one of test log information of a function, a code size of the function, whether an external library is needed during the execution of the function, and whether other functions are included in the function, the processor 220 may determine a computation amount of the function. The processor 220 may provide recommendation information regarding memory specifications or CPU specifications about the function based on the determined computation amount of the function.

The processor 220 may analyze the execution information of the function to determine time information about a time at which the function is requested more than a preset number of times, and generate and allocate resources for executing the function, before a point in time corresponding to the determined time information. For example, the processor 220 may generate a first invoker and a first container to execute a function A at a particular point in time, and may include or install data, files, libraries, or the like, that are needed to execute the function A in the first container. In addition, the processor 220 may determine a number of first invokers or a number of the first containers based on the number of times of an execution request for the function A.

In addition, by analyzing characteristics information of a function, the processor 220 may determine a computation amount of the function, and determine an amount of resources allocated based on the determined computation amount. For example, by analyzing characteristics of the function A, the processor 220 may determine a computation amount of the function A, and when the determined computation amount of the function A is equal to or greater than a preset computation amount, the processor 220 may allocate a relatively large amount of resources to the function A.

Meanwhile, the processor 220 may predict, for each function, a point in time of an execution request or a number of times of an execution request at the point in time, based on a prediction model. The prediction model may be trained by using execution information regarding a function. In addition, the processor 220 may predict, for each function, a job load, a response time, a function execution time, a memory size needed for execution of a function, or the like, based on a prediction model. The prediction model may be trained by using characteristics of a function. The prediction model may be a model based on a neural network, such as a deep neural network (DNN), a recurrent neural network (RNN), a bidirectional recurrent deep neural network (BRDNN), but is not limited thereto.

In addition, the processor 220 may execute a function by using resources allocated to the function in response to an execution request for the function. For example, when a first container and a first invoker for executing the function A are previously generated, and when an execution request for function A is received, the processor 220 may quickly execute the function A without a time delay by using the generated first invoker and the generated first container.

The communicator 210 may transmit or receive data or signals to or from an external device or an external server according to the control by the processor 220. The communicator 210, according to an embodiment, may perform an operation of the web server 25 illustrated in and described with reference to FIG. 1. For example, the communicator 210 may receive an execution request for a function from the external device or the external server through a network. [70] The communicator 210 may include at least one component that allows communication through a local area network (LAN), a wide area network (WAN), a value added network (VAN), a mobile radio communication network, a satellite communication network or a combination thereof. In addition, the communicator 210 may transmit or receive data or signals in a wireless manner immediately through a wireless LAN (e.g., Wi-Fi) with an external device or an external server. The communicator 210 may be a combination of hardware and software such as a network card.

Meanwhile, the block diagrams of the system 100 or 200 illustrated in FIGS. 1 through 3 are block diagrams, according to an embodiment. The elements in the block diagrams may be integrated, added, or omitted according to the specifications of the system 100 or 200 that are implemented. That is, according to necessity, two or more components may be integrated into a single component or a single component may be divided into two or more components. In addition, functions performed in respective blocks are for the purpose of describing embodiments, and detailed operations or devices do not limit the scope of the disclosure.

Figure 4:
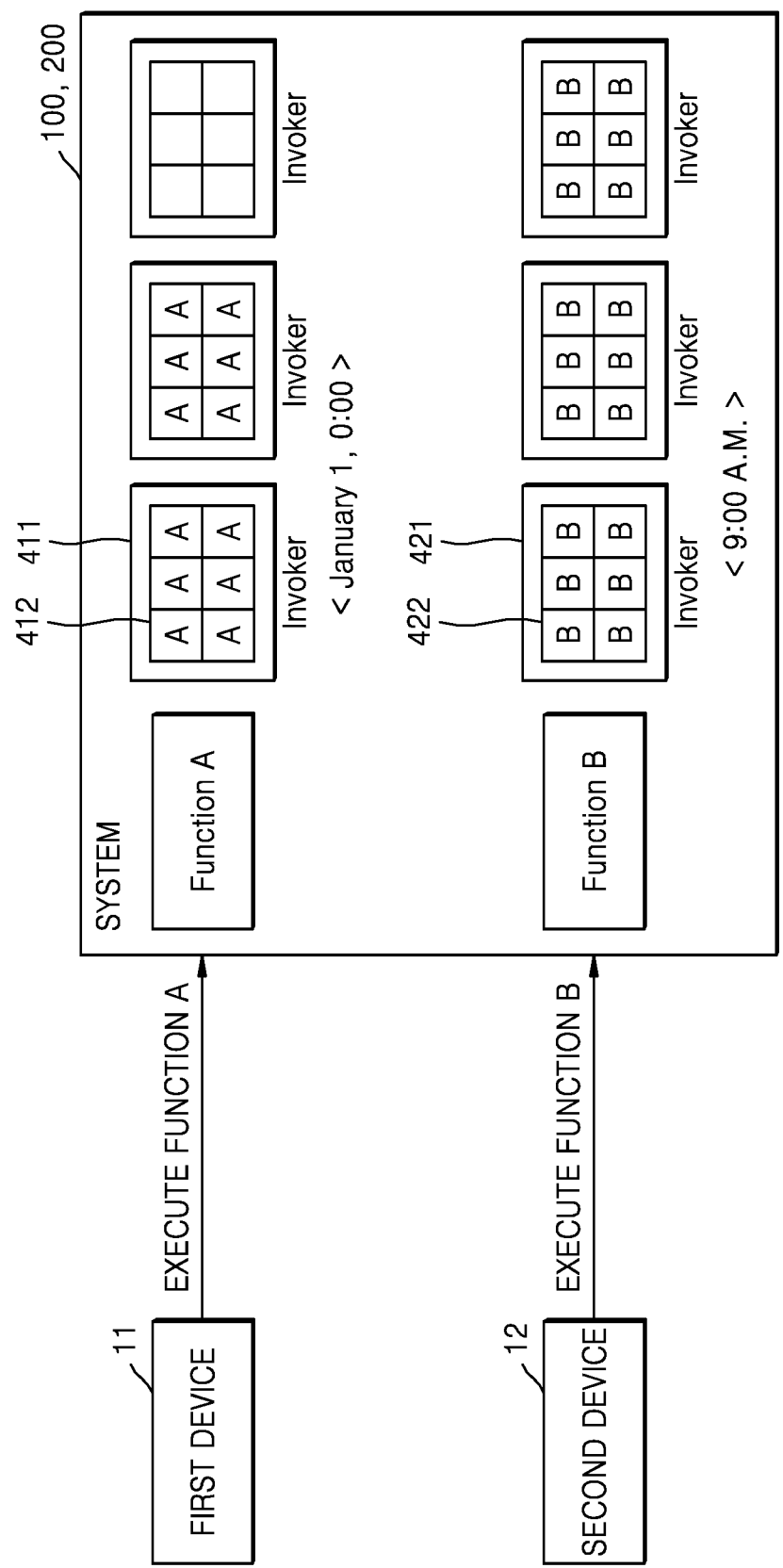
FIG. 4 is a view illustrating an operation of a system, according to an embodiment.

FIG. 4 is a view illustrating an operation of a system 100 or 200, according to an embodiment.

The system 100 or 200, according to an embodiment, may monitor execution information of a function. For example, the system 100 or 200 may monitor a point in time when an execution request for a function is received, a number of times that the execution request for a function is requested, a frequency of execution requests for the function. In addition, the system 100 or 200 may count the number of times of an execution request for the function according to months, days of the week, time zones, or anniversaries.

Meanwhile, the system 100 or 200 may predict, for each function, a point in time of an execution request or a number of times of an execution request at the point in time, based on a prediction model. The prediction model may be trained by using execution information of a function.

Accordingly, the system 100 or 200 may determine time information about a time at which an execution request for a function is made, a preset number of times, or more, and generate and allocate resources for executing the function, before a point in time corresponding to the determined time information.

For example, when the number of times of an execution request for the function A is equal to or greater than a preset number of times at 0:00 on January 1 of every year, the system 100 or 200 may further generate, before 0:00 on January 1 of each year, a first container 412 and a first invoker 411 to execute the function A. In addition, the system 100 or 200 may determine a number of the first containers 412 and the first invokers 411 to be additionally generated, by considering the number of times of an execution request for the function A corresponding to the determined time information (for example, 0:00 on January 1 of every year). Here, data, files, libraries, or the like needed to execute the function A may be included or installed in the first container 412. For example, when an external library is needed to execute the function A, the external library may be downloaded in advance into the first container 412 before a point in time corresponding to the determined time information. In addition, when a library is compressed together in a file for executing a function or includes an installation file, the compression may be decompressed or the installation file may be executed to install the library in advance before the point in time corresponding to the determined time information.

Accordingly, when an execution request for function A is received from a first device 11, the system 100 or 200 may quickly execute function A without time delay by using the first container 412 and the first invoker 411, which have been generated in advance. The first invoker 411 may control the first container 412 such that the function A is executed by using the first container 412. For example, the first invoker 411 may transfer a code corresponding to the function A to the first container 412, and the first container 412 may execute the code corresponding to the function A.

When a number of times of an execution request for a function B is equal to or greater than a preset number of times at 9:00 A.M. every day, the system 100 or 200 may additionally generate, before 9:00 A.M. every day, a second container 422 and a second invoker 421 to execute the function B. Accordingly, the pool generator 37 may generate, before 9:00 A.M., every day, a second container 422 and a second invoker 421, to execute the function B. The system 100 or 200 may determine a number of second containers 422 and a number of second invokers 421 to be additionally generated, by considering the number of times of the execution request for the function B corresponding to the determined time information (for example, 9:00 A.M. every day). Here, data, files, libraries, or the like needed for executing the function B may be included or installed in the second container 422.

Accordingly, when an execution request for the function B is received from a second device 12, the system 100 or 200 may quickly execute the function B without a time delay by using the second container 422 and the second invoker 421 that are generated in advance (prior to the execution request). The second invoker 421 may control the second container 422 such that the function B is executed by using the second container 422.

Figure 5:
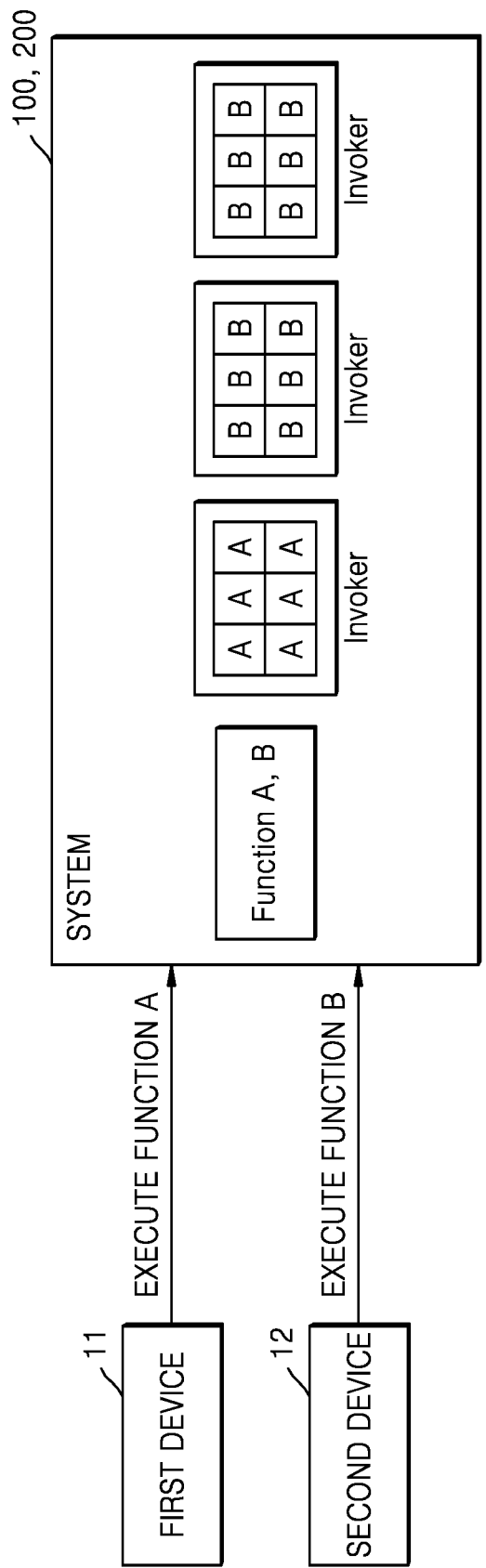
FIG. 5 is a view illustrating an operation of a system, according to an embodiment.

FIG. 5 is a view illustrating an operation of a system 100 or 200, according to an embodiment.

The system 100 or 200, according to an embodiment, may analyze characteristics of a function. For example, the system 100 or 200 may analyze test log information of a function, a code size of the function, whether an external library is needed during an execution of the function, whether other functions are included in the function, or the like to determine a computation amount of the function. The system 100 or 200 may determine an amount of resources allocated to the function based on the determined computation amount of the function.

When the computation amount of the function A is smaller than a preset computation amount, the system 100 or 200 may allocate typical resources to the function A, and when a computation amount of the function B is equal to or greater than a preset computation amount, more resources than those allocated to the function A may be allocated to the function B. For example, when a computation amount of the function A is determined to be smaller than a preset computation amount, the system 100 or 200 may allocate N containers to the function A. Accordingly, when an execution request for the function A is received from the first device 11, the system 100 or 200 may execute the function A by using the N containers allocated to the function A.

On the other hand, when a computation amount of the function B is determined to be greater than a preset computation amount, the system 100 or 200 may allocate M containers, which is more than N, to the function B. Accordingly, when an execution request for the function B is received from the second device 12, the system 100 or 200 may execute the function B by using the M containers allocated to the function B.

The preset computation amount may include a plurality of values, and the system 100 or 200 may allocate different resources to sections including the computation amount of the function. Accordingly, an execution speed of the function may be increased, and resources of the system may be managed efficiently.

Figure 6:
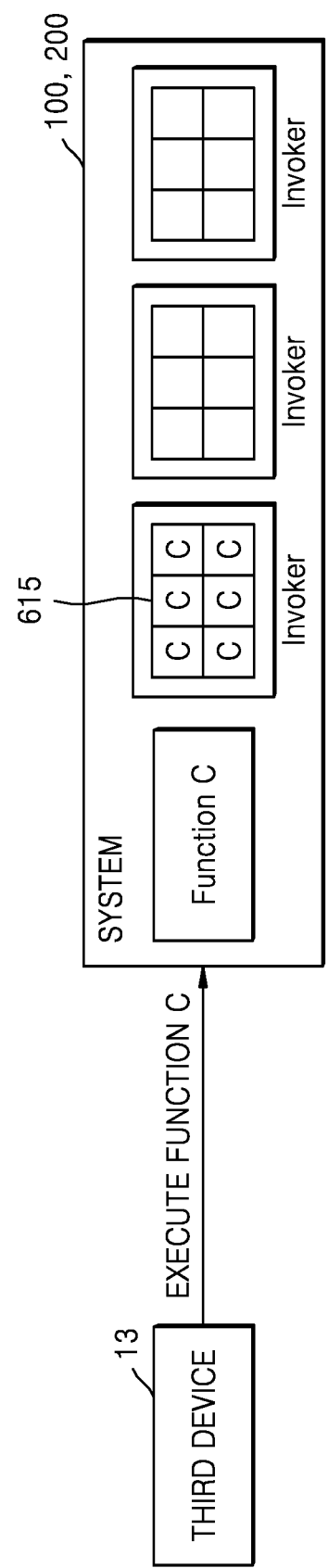
FIG. 6 is a view illustrating an operation of a system, according to an embodiment.

FIG. 6 is a view illustrating an operation of a system 100 or 200, according to an embodiment.

The system 100 or 200 may determine whether an external library is needed during an execution of a function, and when an external library is needed, the system 100 or 200 may download the external library in advance (prior to the execution request). For example, when a library is compressed together in a file for executing a function C or includes an external library installation file, the compression may be decompressed in advance or the installation file may be executed to install the library in a container 615 allocated to the function C. Here, the system 100 or 200 may predict a point in time at which the function C is to be requested, and may download the external library in advance, before the predicted point in time.

When a library needed for execution of a function is previously downloaded or installed in a container, the system 100 or 200 may have shorter response time for an execution request for a function compared to when executing a function after downloading a library.

Figure 7:
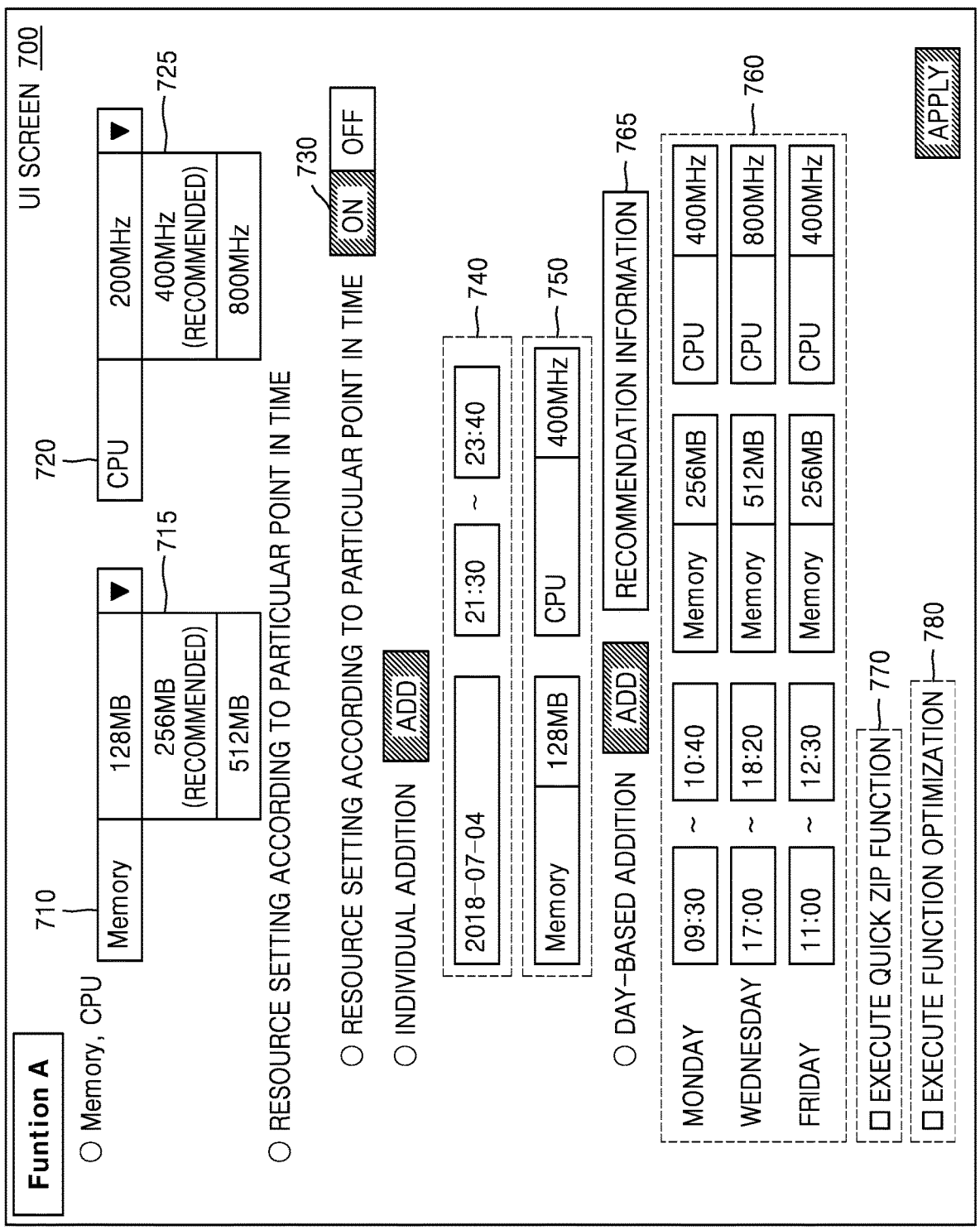
FIG. 7 is a view illustrating a user interface screen provided in a system, according to an embodiment.

FIG. 7 is a view illustrating a user interface (UI) screen 700 provided in a system 100 or 200, according to an embodiment.

Referring to FIG. 7, the system 100 or 200, according to an embodiment, may set specifications of a memory and a CPU for each function, and may provide a user interface (UI) screen 700 via which the specifications of the memory and the CPU may be set according to each function and each point in time.

For example, the user interface (UI) screen 700 may include an item for setting specifications of a memory or a CPU with respect to a particular function, an item for selecting an automatic prediction function with respect to a particular function, an item for setting specifications of a memory or a CPU according to a particular point in time with respect to a particular function.

FIG. 7 illustrates an example in which the function A is selected and resources corresponding to the function A are set. A user may set memory specifications regarding the function A by using a first item 710, and set CPU specifications for the function A by using a second item 720.

For example, when the memory specifications is set to 128 MB, and the CPU specifications is set to 200 MHz, and an execution request for the function A is received, the function A may be executed by using a memory of 128 MB and a CPU of 200 MHz.

Meanwhile, the system 100 or 200 may analyze characteristics of the function A, and provide recommendation information related to setting of resources to execute the function A.

For example, the system 100 or 200 may determine a computation amount of the function A based on at least one of test log information of the function A, a code size of the function A, whether an external library is needed during the execution of the function A, and whether other functions are included in the function A. The system 100 or 200 may provide recommendation information 715 and 725 regarding the memory specifications or the CPU specifications of the function A based on the determined computation amount of the function, as illustrated in FIG. 7.

In addition, by using a third item 730, the user may select whether to apply an automatic prediction function with respect to the function A. For example, when applying an automatic prediction function to the function A, the system 100 or 200 may predict a point in time with respect to an execution of the function A by monitoring execution information of the function A (for example, a point in time of an execution request for the function A, a number of times an execution of the function A is requested, a frequency of execution requests for the function A, or the like), and may allocate, before the predicted point in time, optimized resources for executing the function A. In addition, by using a fourth item 740 and a fifth item 750, the user may set the memory specifications and/or the CPU specifications corresponding to a particular date and a particular time with respect to the function A. For example, when a date is set to Jul. 4 of 2018, and a time is set to: from 21:30 to 23:40, and the memory specifications are set to 128 MB and the CPU specifications are set to 400 MHz, and an execution request for the function A is received between 21:30 and 23:40 on Jul. 4, 2018, then the function A is performed by using a memory of 128 MB and a CPU of 400 MHz.

In addition, by using a sixth item 760, the user may set the memory specifications and the CPU specifications, corresponding to a particular time according to days of the week, with respect to the function A. For example, when a day of the week is set to Monday, time is set between 9:30 and 10:40, and memory specifications to 256 MB, and CPU specifications to 400 MHz, and an execution request for the function A is received on Monday, between 9:30 and 10:40, the function A is executed by using a memory of 256 MB and a CPU of 400 MHz.

Meanwhile, the system 100 or 200 may provide a user with recommendation information related to resource setting according to a day of the week based on a result of analyzing execution information of the function A (e.g., a point in time of an execution request for the function A, a number of times an execution of the function A is requested, a frequency of the execution requests for the function A, or the like). For example, when a recommendation information icon 765, illustrated in FIG. 7, is selected, the system 100 or 200 may provide recommendation information related to the memory specifications or the CPU specifications of the function A according to days of the week or recommended memory specifications or recommended CPU specifications for the function A according to days of the week may be automatically input into the sixth item 760. However, the disclosure is not limited thereto.

Also, when an external library or the like is included in a function as a compressed file, the user may set, by using a seventh item 770, whether to decompress or download the external library in a container in which a function is to be executed, in advance, before executing the function.

In addition, by using an eighth item 780, the user may determine a computation amount according to characteristics of a function, and set whether to allocate optimized resources (for example, determining an amount of resources) based on the determined computation amount.

Figure 8:
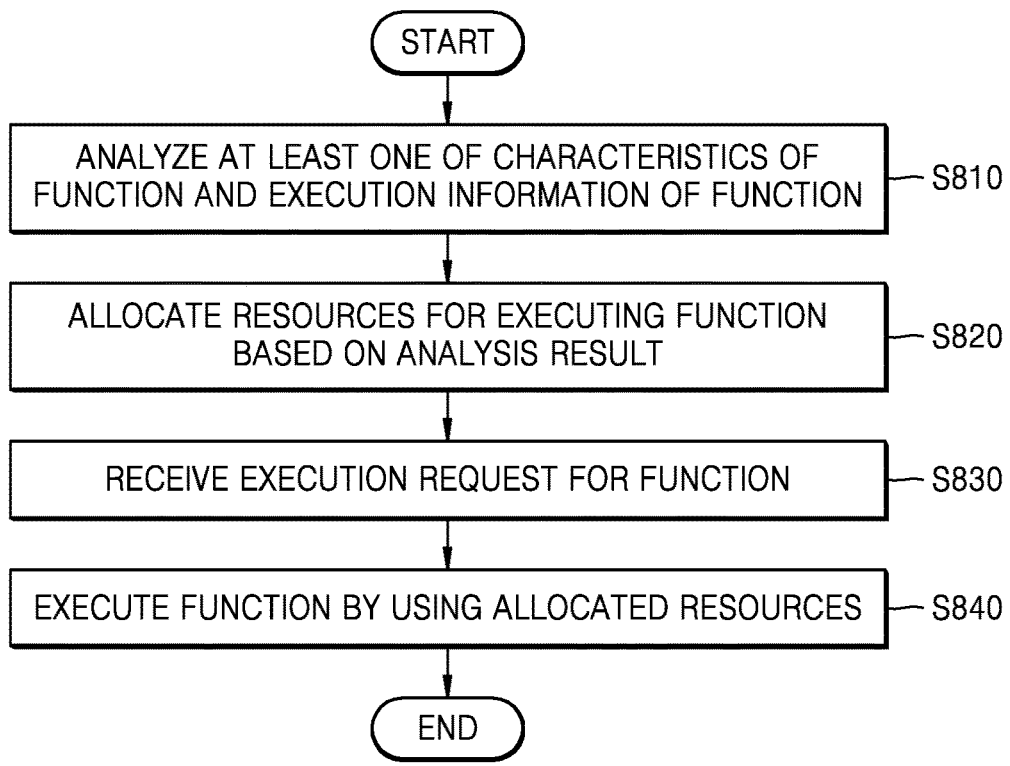
FIG. 8 is a flowchart illustrating an operating method of a system, according to an embodiment.

FIG. 8 is a flowchart illustrating an operating method of a system 100 or 200, according to an embodiment.

Referring to FIG. 8, the system 100 or 200 may analyze at least one of characteristics of a function and execution information of the function (in operation S810).

For example, the system 100 or 200 may analyze test log information of a function, a code size of the function, whether an external library is needed during the execution of the function, whether other functions are included in the function, or the like. Alternatively, the system 100 or 200 may analyze a point in time of an execution request for a function, a number of times an execution of the function is requested, a frequency of execution requests for the function, or the like. This will be described in more detail below with reference to FIG. 9.

The system 100 or 200 may allocate resources for executing a function based on an analysis result (in operation S820).

For example, the system 100 or 200 may determine a computation amount of the function A by analyzing characteristics of the function A, and when the determined computation amount of the function A is equal to or greater than a preset computation amount, the system 100 or 200 may allocate a relatively large amount of resources to the function A. Alternatively, when an external library is needed during the execution of the function A, the system 100 or 200 may allocate a container for executing the function A, and download an external library in advance in the container allocated to the function A.

Alternatively, the system 100 or 200 may predict a point in time of an execution request for the function A and a number of times requests for the function A are made, by analyzing execution information of the function A, and may allocate resources to execute the function A according to the predicted point in time and the predicted number of times. This will be described in more detail below with reference to FIG. 9.

Upon receiving an execution request for the function (in operation S830), the system 100 or 200 may execute the function by using the resources allocated in operation S820 (in operation S840).

For example, in operation S820, when a first container and a first invoker are generated to execute the function A, and an execution request for the function A is received, the system 100 or 200 may quickly execute the function A without a time delay by using the first invoker and the first container.

Figure 9:
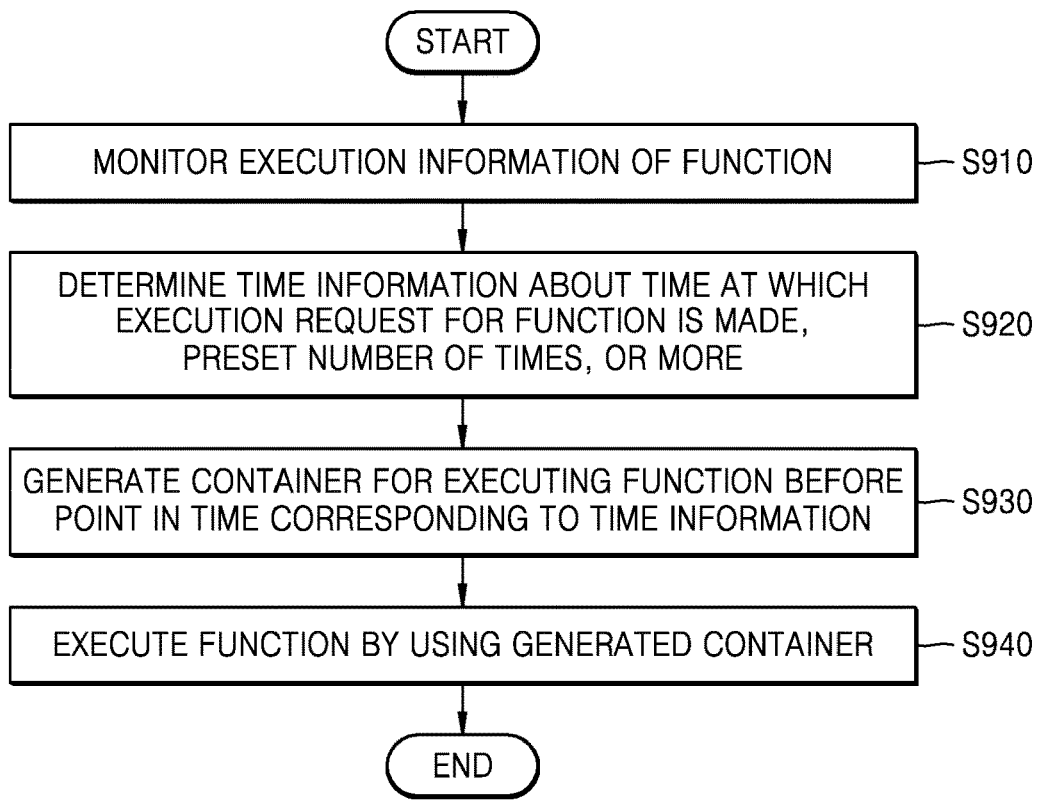
FIG. 9 is a flowchart illustrating an operating method of a system, according to an embodiment.

FIG. 9 is a flowchart illustrating an operating method of a system 100 or 200, according to an embodiment.

Referring to FIG. 9, the system 100 or 200 may monitor execution information of a function (in operation S910).

For example, the system 100 or 200 may monitor a point in time when an execution request for a function is received, a number of times that an execution of the function is requested, a frequency of execution requests for the function, or the like. In addition, the system 100 or 200 may count a number of times of an execution request for the function according to months, days of the week, time zones, or anniversaries, monitor execution information of each function, and analyze the monitored information and store the same in a database.

The system 100 or 200 may determine time information about a time at which an execution request for the function is made a preset number of times or more, based on the information monitored in operation S910 (in operation S920).

For example, when a number of times of an execution request for the function A is equal to or greater than a preset number of times at 0:00 on January 1 of every year, the system 100 or 200 may determine, as time information, 0:00 on January 1 of each year. Alternatively, when a number of times of an execution request for the function B at 9:00 A.M. every day is equal to or greater than a preset number of times, the system 100 or 200 may determine, as time information, 9:00 A.M. every day. However, the disclosure is not limited thereto.

The system 100 or 200 may generate a container for executing a function, before a point in time corresponding to the time information determined in the operation S920 (in operation S930).

For example, the system 100 or 200 may generate, before 0:00 on January 1 of every year, a first container and a first invoker to execute the function A. For example, data, files or libraries, or the like needed to execute the function A may be included or installed in the first container. The system 100 or 200 may determine a number of first invokers and first containers based on the monitored number of times of the execution request for the function A in operation S910.

In addition, the system 100 or 200 may generate, before 9:00 A.M. every day, a second invoker or a second container to execute the function B, and may determine a number of second invokers and second containers based on a number of times of an execution request for the function B.

Upon receiving an execution request for the function, the system 100 or 200 may execute the function by using a container generated in advance in operation S930 (in operation S940).

For example, in operation S930, when a first container and a first invoker are generated to execute the function A, and an execution request for the function A is received, the system 100 or 200 may quickly execute the function A without time delay by using the first invoker and the first container.

Figure 10:
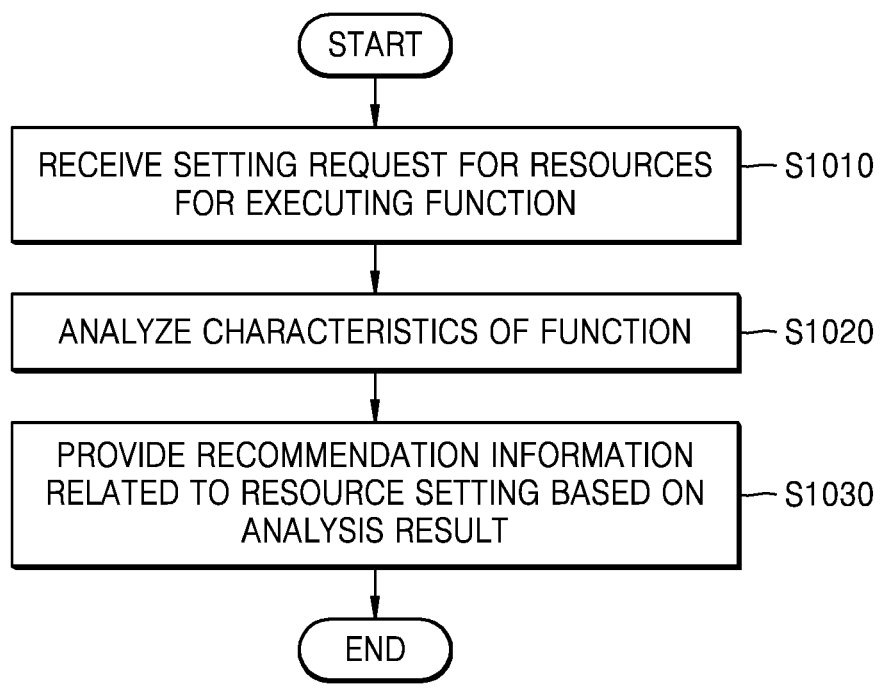
FIG. 10 is a flowchart illustrating an operating method of a system, according to an embodiment.

FIG. 10 is a flowchart illustrating an operating method of a system 100 or 200, according to an embodiment.

Referring to FIG. 10, the system 100 or 200 may receive a setting request for resources used to execute a function (in operation S1010).

In response to the setting request for resources, the system 100 or 200 may provide a user interface screen including an item for setting specifications of a memory and/or a CPU with respect to a particular function, an item for selecting whether to apply an automatic prediction function with respect to a particular function, an item for setting specifications of a memory and/or a CPU according to particular points in time with respect to a particular function.

In addition, the system 100 or 200 may analyze characteristics of a function for which resource setting is requested (in operation S1020).

For example, the system 100 or 200 may determine a computation amount of a function based on at least one of test log information of the function, a code size of the function, whether an external library is needed during the execution of the function, and whether other functions are included in the function.

In addition, the system 100 or 200 may analyze execution information of the function (e.g., a point in time of an execution request for the function, a number of times of an execution request for the function, a frequency of execution requests for the function, or the like). For example, the system 100 or 200 may monitor a point in time of an execution request for a function, a number of times of an execution request for the function, a frequency of execution requests for the function, or the like. In addition, the system 100 or 200 may count a number of times of an execution request for a function according to months, days of the week, time zones or anniversaries by using a prediction model. The prediction model may be trained by using the execution information of the function. Accordingly, the system 100 or 200 may determine time information about a time at which an execution request for the function is made, a preset number of times, or more.

The system 100 or 200 may provide recommendation information related to resource setting based on an analysis result (in operation S1030).

For example, the system 100 or 200 may provide recommendation information regarding memory specifications and/or CPU specifications about the function based on the determined computation amount of the function.

In addition, the system 100 or 200 may provide a user with recommendation information related to resource setting according to particular times or days of the week (recommendation information regarding memory specifications or CPU specifications), based on a result of analyzing the execution information of the function, but is not limited thereto.

According to the system of the embodiment, a response time to an execution request for a function, an execution time of a function, or the like, may be fast.

According to the system of the embodiment, resources used to execute a function may be used efficiently.

The operating method of the system for providing a FaaS, according to an embodiment, can be implemented as program instructions that can be executed using various computer components and can be written to a computer readable recording medium. The computer readable recording medium may include program instructions, a data file, a data structure, etc. alone or in combination. The program instructions written to the computer readable recording medium may be specifically designed and configured for embodiments of the present disclosure or may be well-known and available to one of ordinary skill in the art. Examples of the computer readable recording medium include magnetic media (e.g., hard disks, floppy disks, magnetic tapes, etc.), optical media (e.g., CD-ROMs, or DVDs), magneto-optical media (e.g., floptical disks), and hardware devices specifically configured to store and execute program instructions (e.g., ROM, RAM, flash memories, etc.). Examples of the program instructions include not only machine codes generated by using a compiler but also high-level language codes that can be executed on a computer by using an interpreter or the like.

Also, the system for providing a FaaS, according to embodiments, or the operating method of the system may be included in a computer program product to be provided. The computer program product may be traded as a product between a seller and a buyer.

The computer program product may include a software program and a computer-readable storage medium storing a software program. For example, the computer program product may include a product (e.g., a downloadable application) that is electronically distributed as a software program through an electronic market (e.g., Google Play Store™ or AppStore) or a manufacturer of an electronic device. For electronic distribution, at least a part of the software program may be stored in a storage medium or may be temporarily generated. In this case, the storage medium may be a server of the manufacturer, a server of the electronic market, or a storage medium of a relay server that temporarily stores the software program.

The computer program product may include a storage medium of a server or a storage medium of a client apparatus in a system including the server and the client apparatus. Alternatively, when a third apparatus (e.g., a smartphone) communicating with the server or the client apparatus exists, the computer program product may include a storage medium of the third apparatus. Alternatively, the computer program product may include a software program itself transmitted from the server to the client apparatus or the third terminal or from the third apparatus to the client apparatus.

In this case, one from among the server, the client apparatus, and the third apparatus may execute the computer program product and may perform the method according to embodiments. Alternatively, two or more from among the server, the client apparatus, and the third apparatus may execute the computer program product and may execute the method according to embodiments.

For example, the server (e.g., a cloud server or an artificial intelligence (AI) server) may execute the computer program product stored in the server and may control the client apparatus communicating with the server to perform the method according to embodiments.

While one or more embodiments have been described with reference to the figures, the scope of the present disclosure is not limited thereto, and it will be understood by those of ordinary skill in the art that various changes in form and details may be made therein without departing from the spirit and scope as defined by the following claims and their equivalents.

What is claimed is:

1. A system of providing a function as a service (FaaS), the system comprising:
    a communicator configured to communicate with at least one external device;
    a memory storing at least one instruction; and
    a processor configured to execute the at least one instruction stored in the memory,
    wherein the processor is further configured to execute the at least one instruction to:
    receive a request for setting resources related to the function from the at least one external device,
    based on the request for setting resources, analyze characteristics of the function and execution information of the function,
    obtain first recommendation information including information about an amount of the resources based on the analysis result,
    display the first recommendation information, and an item for selecting automatic prediction with respect to the function,
    based on selecting the item for selecting the automatic prediction, predict a point in time of execution of the function according to the analyzed execution information and allocate the resources for executing the function before the point in time of the execution of the function based on the first recommendation information, and
    execute the function by using the allocated resources.

2. The system of claim 1, wherein the processor is further configured to execute the at least one instruction to determine a computation amount required for the function based on at least one of test log information of the function, a code size of the function, whether an external library is needed during an execution of the function, and whether other functions are included in the function, and generate the first recommendation information based on the computation amount required for the function.

3. The system of claim 1, wherein the execution information of the function comprises at least one of a point in time in which an execution request for the function is made, a number of times the execution request for the function is made, and a frequency of making the execution request for the function,
    wherein the processor is further configured to execute the at least one instruction to monitor the point in time in which the execution request for the function to determine time information about a point in a time at which an execution request for the function is made a preset number of times or more and to obtain the first recommendation information based on the number of times of the execution request for the function is made, which corresponds to the time information.

4. The system of claim 1, wherein the processor is further configured to execute the at least one instruction to generate, based on at least one of characteristics of a first function and execution information of the first function, a first container corresponding to the first function, and generate a second container corresponding to a second function based on at least one of the characteristics of the second function and the execution information of the second function,
    wherein, the first function is executed by using the first container based on the execution request for the first function, and the second function is executed by using the second container based on the execution request for the second function.

5. The system of claim 1, wherein the processor is further configured to execute the at least one instruction to monitor a point in time of the execution request for the function to determine time information about a point in time at which an execution request for the function is made a preset number of times or more and allocate the resources for executing the function based on the determined time information.

6. The system of claim 5, wherein the processor is further configured to execute the at least one instruction to generate, before the point in time corresponding to the time information, an invoker and a container, to execute the function.

7. The system of claim 5, wherein the processor is further configured to execute the at least one instruction to determine an amount of resources for executing the function based on the preset number of times the execution request for the function is made, which corresponds to the determined time information.

8. The system of claim 1, wherein the allocated resources comprise a container in which an external library needed to execute the function is downloaded prior to the execution request for the function.

9. The system of claim 1, wherein the processor is further configured to execute the at least one instruction to determine a computation amount of the function based on the characteristics of the function, and to allocate a first predetermined number of containers to the function based on the computation amount of the function determined to be less than a preset computation amount and allocate a second predetermined number of containers, which is more than the first predetermined number of containers, to the function based on the computation amount of the function determined to be equal to or greater than the preset computation amount.

10. An operating method of providing a function as a Service (FaaS), the operating method comprising:
receiving a request for setting resources related to the function from at least one external device;
analyzing characteristics of the function and execution information of the function based on the request for setting resources;
obtaining first recommendation information including information about an amount of the resources based on a result of the analyzing;
displaying the first recommendation information, and an item for selecting automatic prediction with respect to the function,
based on selecting the item for selecting the automatic prediction, predicting a point in time of execution of the function according to the analyzed execution information, allocating the resources for executing the function before the point in time of the execution of the function; and
executing the function by using the allocated resources.

11. The system of claim 1, wherein the processor is further configured to display an item for setting the resources corresponding to at least one time period,
based on selecting the item for setting the resources corresponding to the at least one time period, obtain second recommendation information corresponding to the at least one time period based on the first recommendation information, and allocate the resource for executing the function based on the second recommendation information.

12. The operating method of claim 10, wherein the analyzing the characteristics of the function comprises determining a computation amount of the function based on at least one of test log information of the function, a code size of the function, whether an external library is needed during an execution of the function, and whether other functions are included in the function,
wherein the obtaining the first recommendation information comprises obtaining the first recommendation information based on the computation amount of the function.

13. The operating method of claim 10,
wherein the execution information of the function comprises at least one of a point in time in which the execution request for the function is made, a number of times the execution request for the function is made, and a frequency of making the execution request for the function,
wherein the analyzing the execution information of the function comprises monitoring the point in time of the execution request for the function to determine time information about a point in a time at which an execution request for the function is made a preset number of times or more, and
wherein the displaying the first recommendation information based on the analyzing the execution information of the function comprises obtaining the first recommendation information based on the number of times the execution request for the function is made, which corresponds to the time information.

14. The operating method of claim 10, wherein the allocating of resources for executing the function comprises generating, based on at least one of the characteristics of a first function and the execution information of the first function, a first container corresponding to the first function, and generating, based on at least one of the characteristics of a second function and the execution information of the second function, a second container corresponding to the second function, and
wherein the executing of the function comprises executing the first function using the first container based on the execution request for the first function and executing the second function using the second container based on the execution request for the second function.

15. The operating method of claim 10,
wherein the analyzing the execution information of the function comprises monitoring a point in time of the execution request for the function to determine time information about a point in a time at which an execution request for the function is made a preset number of times or more, and
wherein the allocating of resources for executing the function comprises allocating the resources for executing the function based on the determined time information.

16. A non-transitory computer readable recording medium storing a program, wherein the program, when executed on a computing device, causes the computing device to:
receive a request for setting resources related to a function from at least one external device;
analyze characteristics of the function and execution information of the function based on the request for setting resources;
obtain first recommendation information including information about an amount of the resources based on the result of the analyzing;
display the first recommendation information, and an item for selecting automatic prediction with respect to the function;
based on selecting the item for selecting the automatic prediction, predict a point in time of execution of the function according to the analyzed execution information and allocate the resources for executing the function before the point in time of the execution of the function; and
execute the function by using the allocated resources.

* * * * *